United States Patent Office 3,439,497
Patented Apr. 22, 1969

3,439,497
DEVICE FOR PROTECTING A GAS TURBINE ENGINE COMPRESSOR AGAINST THE EFFECTS OF SURGING
Walter George Cross, Derby, England, assignor to Rolls-Royce Limited, Derby, Derbyshire, England, a British company
Filed Apr. 17, 1967, Ser. No. 631,327
Claims priority, application Great Britain, May 13, 1966, 21,483/66
Int. Cl. F02g 1/06; F02c 9/08
U.S. Cl. 60—39.28    6 Claims

ABSTRACT OF THE DISCLOSURE

A device for protecting a gas turbine engine compressor against the effects of surging detects the rate of reduction of the pressure of the air which has been compressed by the compressor, and, when this exceeds a predetermined value, closes a valve which controls the fuel supply to the engine.

---

Figure 1:
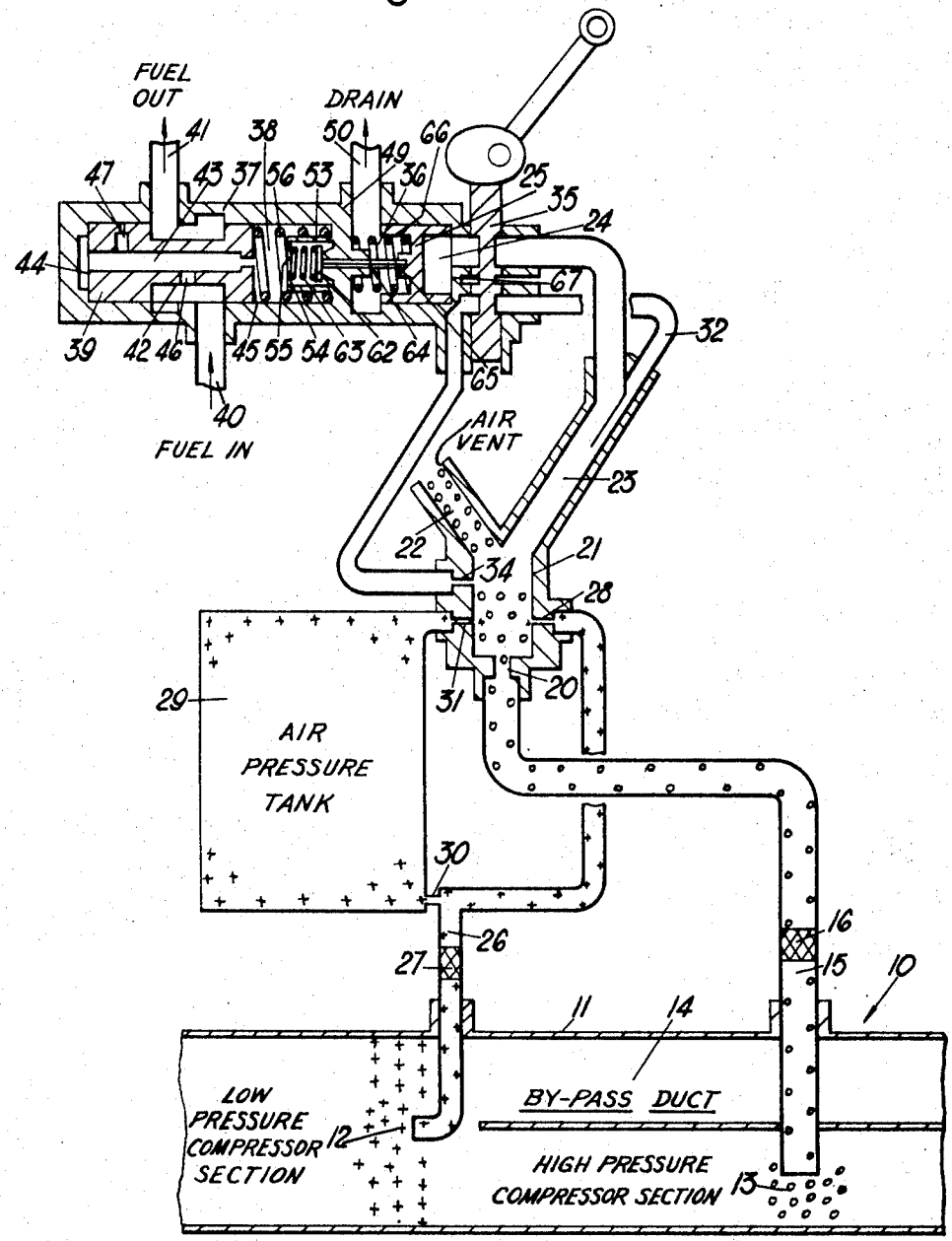

This invention concerns a device for protecting a gas turbine engine compressor against the effects of surging.

According to the present invention, there is provided a device for protecting a gas turbine engine compressor against the effects of surging comprising a fuel conduit, a control valve assembly including a pressure-responsive means which controls in operation the flow of fuel through the fuel conduit, a common duct, means to deliver pressure fluid to the common duct, two conduits, each said conduit communicating with the common duct to receive pressure fluid therefrom, at least one of said conduits communicating with said pressure responsive means, for actuating said control valve, at least one control jet of air derived from the said compressor to sense actual compressor pressure, said at least one jet of air being directed into said common duct to control the relative quantities of the said pressure fluid passing therefrom into the said conduits in dependence upon the pressure of said at least one control jet so as to actuate the control valve being moved by the pressure responsive means in a closing direction whenever the rate of reduction of pressure of the air which has been compressed by the said compressor exceeds a predetermined critical value, retaining means associated with said conduits to ensure that, when said critical value is reached the increased supply of pressure fluid continues to pass to the said one conduit, and override means for overriding the operation of the retaining means.

The invention is based upon the fact that when the compressor of a gas turbine engine is about to surge, there will be a rapid reduction in the pressure of the air compressed thereby. This will cause a rapid alteration in the pressure, or relative pessures, of the said control jet or jets of air, and this in turn will cause the control valve to cut off the supply of fuel through the fuel conduit, whereby the supply of fuel to the combustion equipment of the gas turbine engine will be cut off.

The said retaining means may comprise a bleed passage communicating with said one conduit so as to receive a part of the pressure fluid supplied to the said one conduit, and means for directing the pressure fluid from the bleed passage, as a further jet into the common duct to cause at least the greater part of the said pressure fluid supply to pass to the said one conduit.

A shut-off cock may be provided for simultaneously preventing flow through the said one conduit and through the said bleed passage.

The means for employing the control jet or jets of air may comprise an air duct which is adapted to direct the said control jet or jets into and transversely of the said common duct so as normally to deflect the pressure fluid flowing through the latter preferentially towards the other of said two conduits.

There may be two oppositely directed control jets one of which (which is directed towards the other of said two conduits) is supplied with air directly from the said air duct and the other of which (which is directed towards the said one conduit) is supplied with air from a chamber which has restricted communication with the air duct, the arrangement being such that the pressure of the said one control jet is greater than that of the said other control jet except when the rate of reduction of pressure in the said air duct exceeds the predetermined value.

The control valve may, for example, be a piston valve opposite ends of which are arranged to be exposed to the pressure of the fuel flowing through the fuel conduit, the pressure responsive means being adapted to alter the relative pressure acting on the said opposite ends. Thus, the piston valve may have an axial passage therethrough which extends between the said opposite ends and which is in permanent communication with the fuel conduit on the upstream side of the piston valve, the axial passage having restricted communication with the fuel conduit on the downstream side of the piston valve when the piston valve is in the closed position.

The invention also comprises a gas turbine engine having a compressor provided with a device as set forth above. Thus, the engine may have a low pressure compressor, part of the air compressed by which is supplied to provide the control jet or jets of air, and a high pressure compressor, part of the air compressed by which is supplied to the said common duct to form the said pressure fluid.

Figure 2:
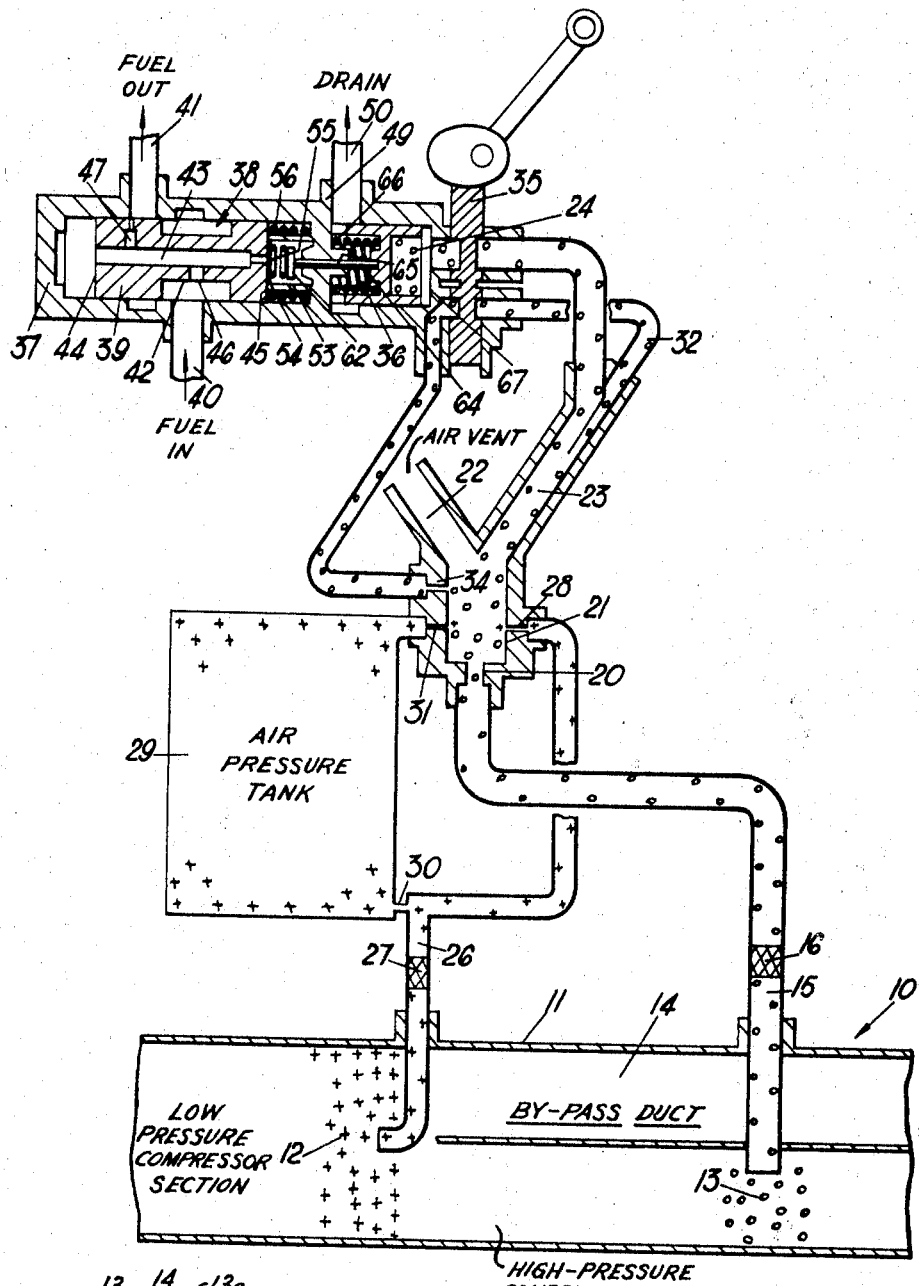
Figure 3:
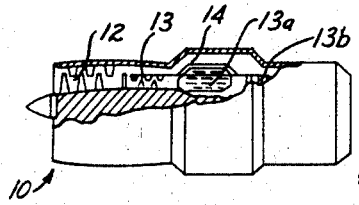

The invention is illustrated, merely by way of example, in the accompanying drawings, in which:

FIGURE 1 is a diagrammatic representation of a device according to the present invention, the parts of the device being shown in the positions in which they are normally located in operation, FIGURE 2 is a view similar to FIGURE 1 but showing the positions of the parts of the device when surging is liable to occur, and FIGURE 3 is a schematic part-sectional, part-elevational view of a gas turbine engine having a device according to the present invention.

The terms "left" and "right" as used in the description below are to be understood to refer to directions as seen in the drawings.

Referring first to FIGURE 3 in the drawings, a gas turbine engine 10 has an outer casing 11 within which there is mounted a low pressure compressor 12. Part of the air compressed by the low pressure compressor 12 passes to a high pressure compressor 13 and thus to combustion equipment 13a and thence to high and low pressure turbines 13b. Another part of the air compressed by the low pressure compressor 12 passes to a by-pass duct 14, the flow through which by-passes the said combustion equipment and turbines. The air passing through the by-pass duct 14 may, if desired, be mixed with the exhaust gases which have passed through the turbines.

A duct 15, which continues a filter 16, extends through the by-pass duct 14, the upstream end of the duct 15 being adapted to receive part of the air compressed in the high pressure compressor 13. This air is diagrammatically represented in the drawings by spaced circles.

The duct 15 communicates by way of a restriction 20 with a duct 21 from which the air from the high pressure compressor 13 may pass into conduits 22, 23. The conduit 22 is vented to atmosphere while the conduit 23 has its downstream end in communication with a space 24 in a piston member 25.

A duct 26, which contains a filter 27, extends across the by-pass duct 14 to receive air which has been compressed by the low pressure compressor 12, this air being diagrammatically represented in the drawings by spaced crosses. The downstream end of the duct 26 communicates with the duct 21 by way of a restriction 28 so that a jet of air from the low pressure compressor 12 is directed into and transversely of the duct 21 and in the general direction of the conduit 22.

A chamber or air pressure tank 29, which communicates with the duct 26 by way of a restriction 30, also communicates with the duct 21 by way of a restriction 31. A jet of air may thus be directed from the restriction 31 into and transversely of the duct 21 and in the general direction of the conduit 23.

In normal operation, the jet from the restriction 28 will be more powerful than that from the restriction 31, and the air in the duct 15 will thus be directed into the conduit 22, and will thereafter tend to remain so which is an inherent feature of the device.

If, however, the pressure of the air flowing through the duct 26 falls rapidly as a result of the compressor 12 being about to surge, the pressure of the jet from the restriction 28 will immediately fall whereas that of the jet from the restriction 31 will temporarily remain substantially unaffected. It may thus be arranged that when this happens the force of the jet from the restriction 31 will exceed that from the restriction 28 and thus the air flowing through the duct 21 will be directed into the conduit 23 and will thereafter tend to continue flowing through the conduit 23.

A retaining means in the form of a bleed passage 32 communicates with the conduit 23 so as to receive part of the air supplied thereto. The downstream end of the bleed passage 32 communicates with the duct 21 by way of a restriction 34. A jet from the restriction 34 may thus be directed into and transversely of the duct 21 so as to be adapted to cause the greater part of the air flowing through the duct 21 to pass to the conduit 23 and hence to the piston member 25. Accordingly, if this is arranged to occur when the pressure from the low pressure compressor 12 has fallen at a rate characteristic of surging being imminent, (a rate which is greater than that which occurs in slam decelerations and is less than that which occurs during normal flight at altitude) then the jet from the bleed passage 32 acts to retain the condition in which the air supplied to the duct 21 passes to the conduit 23.

An override means in the form of a shut-off cock 35 is, however, provided so that flow through both the conduit 23 and the bleed passage 32 may be simultaneously prevented. The shut-off cock 35 may be operable by the pilot's throttle lever control (not shown) so that when the pilot's throttle lever control is actuated to increase the fuel supply to the engine, the shut-off cock 35 will be opened.

The piston member 25 is mounted in a compartment 36 of a body 37. The body 37 also has a compartment 38 in which there is slidably mounted a piston valve 39. The piston valve 39 controls flow between an upstream portion 40 and a downstream portion 41 of a fuel conduit which extends to burners (not shown) of the gas turbine engine 10.

The piston valve 39 has a reduced diameter portion 42 which, when the piston valve 39 is in the open position shown in FIGURE 1, permits fuel to flow freely between the portions 40, 41 of the fuel conduit.

The piston valve 39 has an axial passage 43 which extends therethrough between opposite ends 44, 45 of the piston valve 39. The axial passage 43 is in permanent communication, by way of one or more radial drillings 46, with the portion 40 of the fuel conduit 40, 41. A narrow drilling 47 also extends radially through the piston valve 39 to communicate with the axial passage 43. This drilling 47 has its radially outer end closed by the body 37 when the piston valve 39 is in the open position shown in FIGURE 1. When, however, the piston valve 39 is in the closed position shown in FIGURE 2 in which it prevents normal flow between the portions 40, 41 of the fuel conduit, a restricted flow of fuel may pass from the portion 40 to the portion 41 via the drilling or drillings 46, the axial passage 43 and the drilling 47 so that fuel will be supplied to pilot burners of the engine.

A wall 49 extends transversely across the body 37 so as to separate the compartments 36, 38, the compartment 36 communicating with a drain 50. Mounted within the compartment 38 is a cylindrical member 53 whose curved wall is integral with the wall 49. The cylindrical member 53 has an end wall 54 having an opening 55 therein.

A spring 56 is mounted about the curved wall of the member 53 and acts between the wall 49 and the end 45 of the piston valve 39. The spring 56 thus urges the piston member 39 towards the left, i.e. towards the open position shown in FIGURE 1.

Mounted within the cylindrical member 53 is a disc 62 which is normally urged into contact with the wall 49 by the hydraulic pressure and also by a spring 63 which acts between the end wall 54 and the disc 62.

The disc 62, however, abuts a push rod 64 which passes slidably through the wall 49, the push rod 64 abutting the the piston member 25, and having a longitudinally extending cut-out portion 65. A spring 66 urges the piston member 25 towards the right and towards contact with an end wall 67 of the compartment 36. Thus the spring 66 acts in the same direction as the spring 63.

During normal operation of the gas turbine engine, i.e. when a surge is not imminent, the pressure of the air from the low pressure compressor 12 which is supplied to the duct 26 is such that the jets issuing from the restrictions 28, 31 cause the air in the duct 21 which has been supplied from the high pressure compressor 13 to pass through the conduit 22 to atmosphere. The pressure in the conduit 23 is therefore low and the piston member 25 will accordingly be urged by the spring 66 into the position shown in FIGURE 1. In this position, moreover, the piston valve 39 will be urged by the spring 56 into the open position shown in FIGURE 1 in which the fuel may freely pass between the portions 40, 41 of the fuel conduit.

If, however, surging is about to occur, the pressure of the air supplied to the duct 26 falls rapidly with the result that the relative force of the jets from the restrictions 28, 31 will alter and the flow of high pressure air from the duct 21 will pass to the conduit 23. Some of the high pressure air in the conduit 23 will thus pass to the bleed passage 32 to produce a jet from the restriction 34 which will force the high pressure air supplied to the duct 21 to continue to pass to the conduit 23. This will cause a pressure to be applied to the space 24 of the piston member 25 such as to move the latter towards the left against the force of the spring 66.

The push rod 64 and the disc 62 will thus also be urged towards the left against the action of the spring 63. This will cause fuel in the compartment 38 to escape through the cut-out portion 65 of the push rod 64 and pass to the drain 50. The piston valve 39 now has a greater hydraulic pressure acting on its end 44 than on its end 45. The piston valve 39 therefore slides axially towards the right against the action of the spring 56 until it abuts the cylindrical member 53, when the fuel pressures within the compartment 38 will tend to maintain the piston valve 39 in contact with the cylindrical member 53.

When the piston valve 39 has moved to the right in this way, the main flow of fuel to the portion 41 of the fuel conduit will be cut off, but a restricted flow will continue to pass through the drilling 47 so that the pilot burners may be supplied with fuel.

The parts will remain in this position until the pilot causes the shut-off valve 35 to move to the closed position. When this occurs, the jet from the restriction 34 will cease by reason of the closing of the bleed passage 32 and the high pressure air will automatically return into the conduit 22 and at the same time the shut-off cock 35 will effect venting of the space 24 and thus permit the piston member 25 to be moved towards the right under the action of its spring 66. The disc 62 will thus also move towards the right into contact with the wall 49. Fuel will thus flow through the passage 43 and equalise the hydraulic pressures on the ends 44, 45 of the piston valve 39, with the result that the piston valve 39 will be moved back into the open position shown in FIGURE 1 by the action of the spring 56.

I claim:

1. A device for protecting a gas turbine engine compressor against the effects of surging comprising a fuel conduit, a control valve assembly including a pressure-responsive means which controls in operation the flow of fuel through the fuel conduit, a common duct, means to deliver pressure fluid to the common duct, two conduits, each said conduit communicating with the common duct to receive pressure fluid therefrom, at least one of said conduits communicating with said pressure responsive means, for actuating said control valve, at least one control jet of air derived from the said compressor to sense actual compressor pressure, said at least one jet of air being directed into said common duct to control the relative quantities of the said pressure fluid passing therefrom into the said conduits in dependence upon the pressure of said at least one control jet so as to actuate the control valve being moved by the pressure responsive means in a closing direction whenever the rate of reduction of pressure of the air which has been compressed by the said compressor exceeds a predetermined critical value, retaining means associated with said conduits to ensure that, when said critical value is reached, the increased supply of pressure fluid continues to pass to the said one conduit, and override means for overriding the operation of the retaining means.

2. A device as claimed in claim 1 in which the said retaining means comprises a bleed passage communicating with said one conduit so as to receive a part of the pressure fluid supplied to the said one conduit, and means for directing the pressure fluid from the bleed passage as a further jet into the common duct to cause at least the greater part of the said pressure fluid supply to pass to the said one conduit.

3. A device as claimed in claim 2 in which said override means is a shut-off cock for simultaneously preventing flow through the said one conduit and through the said bleed passage.

4. A device as claimed in claim 1 in which there are two oppositely directed control jets one of which (which is directed towards the other of said two conduits) is supplied with air directly from the said air duct and the other of which (which is directed towards the said one conduit) is supplied with air from an air pressure tank which has restricted communication with the air duct, the pressure of the said one control jet being greater than that of the said other control jet except when the rate of reduction of pressure in the said air duct exceeds the predetermined value.

5. A device as claimed in claim 1 in which the control valve is a piston valve opposite ends of which are arranged to be exposed to the pressure of the fuel flowing through the fuel conduit, the pressure responsive means being adapted to alter the relative pressures acting on the said opposite ends.

6. A device as claimed in claim 5 in which the piston valve has an axial passage therethrough which extends between the said opposite ends and which is in permanent communication with the fuel conduit on the upstream side of the piston valve, the axial passage having restricted communication with the fuel conduit on the downstream side of the piston valve when the piston valve is in the closed position.

References Cited

UNITED STATES PATENTS

| 2,936,581 | 5/1960 | Williams | 60—39.28 XR |
| 3,248,043 | 4/1966 | Taplin et al. | 60—39.28 XR |
| 3,267,669 | 8/1966 | Tissier | 60—39.28 |

JULIUS E. WEST, *Primary Examiner.*

U.S. Cl. X.R.

60—39.29